(12) United States Patent
Chan et al.

(10) Patent No.: US 7,925,781 B1
(45) Date of Patent: Apr. 12, 2011

(54) DISTRIBUTED STORAGE TO SUPPORT USER INTERACTIVITY IN PEER-TO-PEER VIDEO STREAMING

(75) Inventors: Shueng Han Gary Chan, Hong Kong (CN); Wai Pun Yiu, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 270 days.

(21) Appl. No.: 11/754,831

(22) Filed: May 29, 2007

Related U.S. Application Data (60) Provisional application No. 60/808,431, filed on May 26, 2006.

(51) Int. Cl.
*G06F 15/173* (2006.01)
(52) U.S. Cl. ......... 709/238; 709/203; 709/217; 709/232
(58) Field of Classification Search .................. 709/203, 709/217, 231, 232, 238
See application file for complete search history.

(56) References Cited

U.S. PATENT DOCUMENTS

| | | | |
|---|---|---|---|
| 7,136,927 B2 * | 11/2006 | Traversat et al. | 709/230 |
| 7,493,363 B2 * | 2/2009 | Huitema et al. | 709/204 |
| 2004/0054807 A1 * | 3/2004 | Harvey et al. | 709/243 |
| 2005/0044187 A1 * | 2/2005 | Jhaveri et al. | 709/219 |
| 2006/0080454 A1 * | 4/2006 | Li | 709/231 |
| 2006/0168304 A1 * | 7/2006 | Bauer et al. | 709/232 |
| 2007/0288638 A1 * | 12/2007 | Vuong et al. | 709/226 |
| 2008/0208985 A1 * | 8/2008 | Georgis et al. | 709/206 |
| 2008/0244042 A1 * | 10/2008 | Jamin et al. | 709/220 |
| 2008/0281950 A1 * | 11/2008 | Wald et al. | 709/223 |

OTHER PUBLICATIONS

K. A. Hua, Y. Cai, and S. Sheu, "Patching: A Multicast Technique for True Video-on-Demand Services," in Proceedings of the 6th ACM InternationalConference on Multimedia (MM), Bristol, England, Sep. 1998.
L. Gao, D. Towsley, and J. Kurose, "Efficient Schemes for Broadcasting Popular Videos," in Proceedings of the 8th ACM International Workshop on Network and Operating Systems Support for Digital Audio and Video (NOSSDAV), Cambridge, UK, Jul. 1998.
Y. Chu, S. Rao, and H. Zhang, "A Case for End System Multicast," in Proceedings of ACM SIGMETRICS, Santa Clara, CA, USA, Jun. 2000.
[Online]. Available: http://www.bittorrent.com.
X. Zhang, J. Liu, B. Li, and T.-S. P. Yum, "CoolStreaming/DONet: A Data-driven Overlay Network for Live Media Streaming," in Proceedings of IEEE INFOCOM, Miami, FL, USA, Mar. 2005.
K. Sripanidkulchai, A. Ganjam, B. Maggs, and H. Zhang, "The Feasibility of Supporting Large-Scale Live Streaming Applications with Dynamic Application End-Points," in Proceedings of ACM SIGCOMM, Portland, OR, USA, Aug. 2004.

(Continued)

*Primary Examiner* — Phuoc Nguyen
(74) *Attorney, Agent, or Firm* — Turocy & Watson, LLP (57) ABSTRACT

A method of video distribution within a peer-to-peer network. Once the video has initially been downloaded from a server, various fragments of it reside on various peers of the network. At the location of each fragment, the peer which stores it preferably also carries pointers to preceding-fragment, following-fragment, and same-fragment locations. This provides a list-driven capability so that, once a user has attached to any fragment of the program, the user can then transition according to the previous-fragment and following-fragment pointers to play, fast-forward, or rewind the program.

18 Claims, 6 Drawing Sheets

OTHER PUBLICATIONS

A. Sharma, A. Bestavros, and I. Matta, "dPAM: A Distributed Prefetching Protocol for Scalable Asychronous Multicast in P2P Systems," in Proceedings of IEEE INFOCOM, Miami, FL USA, Mar. 2005.

M. Zhou and J. Liu, "A Hybrid Overlay Network for Video-on-Demand," in Proceedings of IEEE International Conference on Communications (ICC), Seoul, Korea, May 2005.

Y. Cui, B. Li, and K. Nahrstedt, "oStream: Asynchronous Streaming Multicast in Application-Layer Overlay Networks," IEEE Journal on Selected Areas in Communications (JSAC), Jan. 2004.

M. Guo, M. H. Ammar, and E. W. Zegura, "Cooperative Patching: A Client based P2P Architecture for Supporting Continuous Live Video Streaming," in Proceedings of the 13th IEEE International Conference on Computer Communications and Networks (ICCCN), Chicago, IL, USA, Oct. 2004.

T. T. Do, K. A. Hua, and M. A. Tantaoui, "P2VoD: Providing Fault Tolerant Video-on-Demand Streaming in Peer-to-Peer Environment," in Proceedings of IEEE International Conference on Communications (ICC), Paris, France, Jun. 2004.

M. Hefeeda, A. Habib, B. Botev, D. Xu, and B. Bhargava, "PROMISE: Peer-to-Peer Media Streaming Using CollectCast," in Proceedings of the 11th ACM International Conference on Multimedia (MM), Berkeley, CA, USA, Nov. 2003, pp. 45-54.

V. N. Padmanabhan, H. J. Wang, P. A. Chou, and K. Sripanidkulchai, "Distributing Streaming Media Content Using Cooperative Networking," in Proceedings of the 12th ACM International Workshop on Network and Operating Systems Support for Digital Audio and Video (NOSSDAV), Miami Beach, FL, USA, May 2002.

I. Stoica, R. Morris, D. Liben-Nowell, D. R. Karger, M. F. Kaashoek, F. Dabek, and H. Balakrishnan, "Chord: A scalable peer-to-peer lookup protocol for internet applications," IEEE/ACM Transactions on Networking, vol. 11, No. 1, pp. 17-32, 2003.

A. Rowstron and P. Druschel, "Pastry: Scalable, Distributed Object Location and Routing for Large-Scale Peer-to-Peer Systems," in Proceedings of IFIP/ACM International Conference on Distributed Systems Platforms (Middleware), Heidelberg, Germany, Nov. 2001, pp. 329-350.

S. Ratnasamy, P. Francis, M. Handley, R. Karp, and S. Shenker, "A Scalable Content-Addressable Network," in Proceedings of ACM SIGCOMM, San Diego, CA, USA, Aug. 2001.

A. Hu, "Video-on-Demand Broadcasting Protocols: A Comprehensive Study," in Proceedings of IEEE INFOCOM, Anchorage, AK, USA, Apr. 2001.

Y. Guo, L. Gao, D. Towsley, and S. Sen, "Seamless Workload Adaptive Broadcast," in Proceedings of IEEE International Packetvideo Workshop, Pittsburgh, PA, USA, Apr. 2002.

D. Eager, M. Vernon, and J. Zahorjan, "Bandwidth Skimming: A Technique for Cost-effective Video-on-Demand," in Proceedings of SPIE/ACM Conference on Multimedia Computing and Networking (MMCN), San Jose, CA, USA, Jan. 2000.

M. Gao and M. H. Ammar, "Scalable live video streaming to cooperative clients using time shifting and video patching," in Proceedings of IEEE INFOCOM, Hong Kong, Apr. 2004.

M. Castro, P. Druschel, A.-M. Kermarrec, A. Nandi, A. Rowstron, and A. Singh, "SplitStream: High-Bandwidth Multicast in Cooperative Environments," in Proceedings of the 19th ACM Symposium on Operating Systems Principles, The Sagamore, Bolton Landing (Lake George), New York, Oct. 2003.

D. Kostic, A. Rodriguez, J. Albrecht, and A. Vahdat, "Bullet: High Bandwidth Data Dissemination Using an Overlay Mesh," in Proceedings of the 19th ACM Symposium on Operating Systems, The Sagamore, Bolton Landing (Lake George), New York, Oct. 2003.

Y.Guo, K. Suh, J. Kurose, and D. Towsley, "P2Cast: Peer-to-peer Patching Scheme for VoD Service," in Proceedings of the 12th ACM International World Wide Web Conference (WWW), Budapest, Hungary, May 2003.

K. A.Hua, D. A. Tran, and R.Villafane, "Overlay Multicast for Video on Demand on the Internet," in Proceedings of the 18th ACM Symposium on Applied Computing (SAC), San Francisco, CA, USA, Mar. 2003.

D. A. Tran, K. A. Hua, and T. T. Do, "Layered Range Multicast for Video On Demand," in Proceedings of the 11th IEEE International Conference on Computer Communications and Networks (ICCCN), Maimi, FL, USA, Oct. 2002.

M. Zhou and J. Liu, "Tree-Assisted Gossiping for Overlay Video Distribution," Kluwer Multimedia Tools and Applications, 2005, to appear.

T. S. E. Ng and H. Zhang, "Predicting Internet Network Distance with Coordinates-Based Approaches," in Proceedings of IEEE INFOCOM, New York,NY, USA, Jun. 2002.

F. Dabek, R. Cox, F. Kaashoek, and R. Morris, "Vivaldi: A Decentralized Network Coordinate System," in Proceedings of ACM SIGCOMM, Portland,OR, USA, Aug. 2004.

T. Asano, D. Ranjan, T. Roos, E. Welzl, and P. Widmaier, "Space Filling Curves and Their Use in Geometric Data Structures," Theoretical ComputerScience, vol. 181, No. 1, pp. 3-15, Jul. 1997.

"The Chord/DHash project." [Online].Availablehttp://pdocs.csail.mit.edu/chord/#downloads.

E. W. Zegura, K. Calvert, and S. Bhattachajee, "How to Model an Internetwork," in Proceedings of IEEE INFOCOM, San Francisco, CA, USA, Apr. 1996.

Y. Wang, S. Wenger, J. Wen, and A. G. Katsaggelos, "Error resilent video coding techniques," IEEE Signal Processing Magazine special issue on Multimedia Communications over Networks, vol. 17, No. 4, pp. 61-82, Jul. 2000.

* cited by examiner

| Hashed media info | Video segment ID | SFC mapped coordinates |

DISTRIBUTED STORAGE TO SUPPORT USER INTERACTIVITY IN PEER-TO-PEER VIDEO STREAMING

CROSS-REFERENCE TO RELATED APPLICATION

This application claims priority from U.S. provisional patent application Ser. No. 60/808,431 filed on May 26, 2006, which is hereby incorporated by reference.

BACKGROUND AND SUMMARY OF THE INVENTIONS

The present application relates to video-on-demand, and more particularly to video on demand in a peer-to-peer network.

With the popularity of broadband Internet access, there has been increasing interest in media streaming services. Video-on-demand (VoD) is one of such services where movies are delivered to desktops of distributed users with low delay and free interactivity (in terms of pause, jump forward/backward, etc.). However, providing VoD with a traditional client-server model, where each client has a dedicated stream from a VoD server, is not scalable to large number of clients. This is mainly due to heavy server load and limited network bandwidth at the server side. Despite many proposals on scalable media streaming using IP multicast, providing such services is still challenging due to the lack of widely deployed multicast-capable networks and dedicated proxy servers. Recently, peer-to-peer (P2P) technologies have provided scalable solutions to many applications, e.g., multicasting and file sharing among distributed users.

In P2P systems, cooperative peers self-organize themselves into overlay networks via unicast tunnels (note, the terms "client" and "peer" are used interchangeably herein). Each peer (called overlay node) in an overlay network acts as an application-layer proxy, caching and relaying data for other peers. In addition, by sharing their resources such as storage and network bandwidth, the capacity of the whole system is greatly increased as compared to traditional client-server architecture. Recent research shows that it is feasible to support large-scale media streaming in the Internet using P2P approach.

Though the P2P approach has been shown to be quite successful for on-demand media streaming, its support for user interactivity is still challenging due to the following reasons:

Request asynchrony—User requests come at different times, so different users are receiving different fragments (e.g. different time-stamped segments) of the media program. Therefore, simply multicasting the stream using ALM does not fulfill all the user requests.

Peer dynamics—Users in the system may join or leave at any time, or even suddenly fail. Hence, there is a need for an efficient mechanism which is resilient to dynamic peer-to-peer environment.

Unpredictable interactivity—Users may jump forward, backward, pause and resume the video at any time. This means that the parents (or "suppliers") of a user may need to be changed quite frequently.

Though P2P file swarming systems like BitTorrent may be used to download the whole media objects before playback, this introduces long startup delay for playback. Though there has been much work on providing on-demand video service in P2P networks (i.e., low startup delay), few tackle the important problem—user interactivity.

There have been many proposals on providing on-demand media streaming using IP multicast, such as patching, periodic broadcasting, stream merging, etc. Those works take advantage of the efficient data dissemination using IP multicast and repeat the media in multicast channels. Nevertheless, over the past decade, the deployment of IP multicast-capable networks has remained very limited.

Recently, live media streaming using P2P approach has been studied. Collaborating peers relay the received stream to others so as to make sure all users to receive the same stream before the playback deadline. Since users in those systems receive the same portion of the media simultaneously, any peer can become a parent of another peer. However, in a P2P MoD (media-on-demand) system, there is a temporal dependency among peers. This means that only peers with requested media in their buffers can become parents of the requesting peer. Therefore, it is more restrictive to find suitable parents in P2P MoD system. Also, there is no interactivity support provided in live media streaming.

Some P2P MoD systems have been proposed. Most of them organize peers into tree-based overlay structures. In a tree-based overlay, a peer receives a stream from its only parent. When its parent leaves the system or fails, the peer needs to find a new parent before the content in its buffer is used up. Otherwise, the peer and all its descendants cannot receive the required media before playback deadline and adversely affect the quality of the streaming media.

Peers in some work also receive streams from several parents. All parents are required to have the full copy of the requested media, which is rarely available in reality.

In other attempts, a hybrid approach is introduced. Upon a tree overlay, a gossip-based data exchange mechanism is added to withstand the unreliability of peers. However, all the parent-children relationships and gossip partners are assigned by a central server. Therefore, the central server needs to keep track of all the users. This centralized approach is not preferred in P2P systems, because a large amount of control traffic would congest the network near the central server. Based on the hybrid approach, a distributed gossip partnership management has been introduced. Though searching parents is achieved using a distributed AVL tree, the network locations of peers are not taken into consideration when assigning parent-children relationship and partnership. Bad assignment may lead to transmission of the stream to and from some bottleneck links many times. Also, transmission from distant parents may experience higher probability of packet loss.

Distributed Storage to Support User Interactivity in Peer-to-Peer Video Streaming In preferred embodiments, the present innovations provide a novel P2P technique, which provides interactive VoD service.

In an example embodiment, videos are divided into smaller segments with identifications and stored in peers distributed over a network. An overlay mesh is built to support playback and interactive functions during playback. In one example implementation, a peer stores one or more video segments in its local storage and keeps a list of the peers who have the previous and the next video segments. Using the list, children can quickly find the peers that have the next requested segments. Peers also preferably keep a list of peers with the same segment for load balancing purposes. If a node is overloaded, it redirects some of its children to other peers on the list. Failure tolerant streaming is preferably implemented and improved by permitting a client to connect to multiple parents that have stored the segment of interest and can stream the video in parallel and collaboratively. In some embodiments, parents are searched for in the P2P network using a distributed hash table, for example, with the key comprising video ID and segment ID.

In some exemplary embodiments such as those described further below, VMesh has at least some or all of the following desirable properties:

Scalability: the system is scalable to large number of users with low server bandwidth requirement. It is completely decentralized, without the need of a server to organize overlay nodes.

Efficiency: users can start playing the media with low delay (without downloading the whole movie).

Failure resilience: the system is robust to node and link failures to offer continuous streaming.

Interactivity support: users can interact with the media at any time.

Does not rely on multicast: Various preferred embodiments do not assume the existence of IP multicast.

Storage versus buffering to reduce complexity: Various preferred embodiments use storage instead of sliding window buffering to reduce complexity.

Multiple Parents: a peer receives non-overlapping portions of the requested media from several parents, and therefore a single parent departure will not degrade the received media very much. Besides, other parents can share the load of the leaving parent before the child finds a new parent.

Reduced Memory Needs: VMesh does not assume its clients storing the whole media, each peer only needs a small amount of memory to buffer the stream it has just played and each storage peer only stores a few segments depending on its own storage capacity.

Decentralized: VMesh applies a decentralized approach to search parents. In addition, the network locations of peers are considered so as to assign close peers to stream data. Moreover, VMesh supports interactivity in which users can jump forward or backward during playback.

Avoiding server-end bottlenecks;

Optimizing use of local storage capacity;

Using partial localization information (implicit in table) to at least partly optimize the efficiency of bandwidth utilization in a P2P network; and An efficient way to identify adjacent video segments (by forward and backward pointers).

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Figure 1:
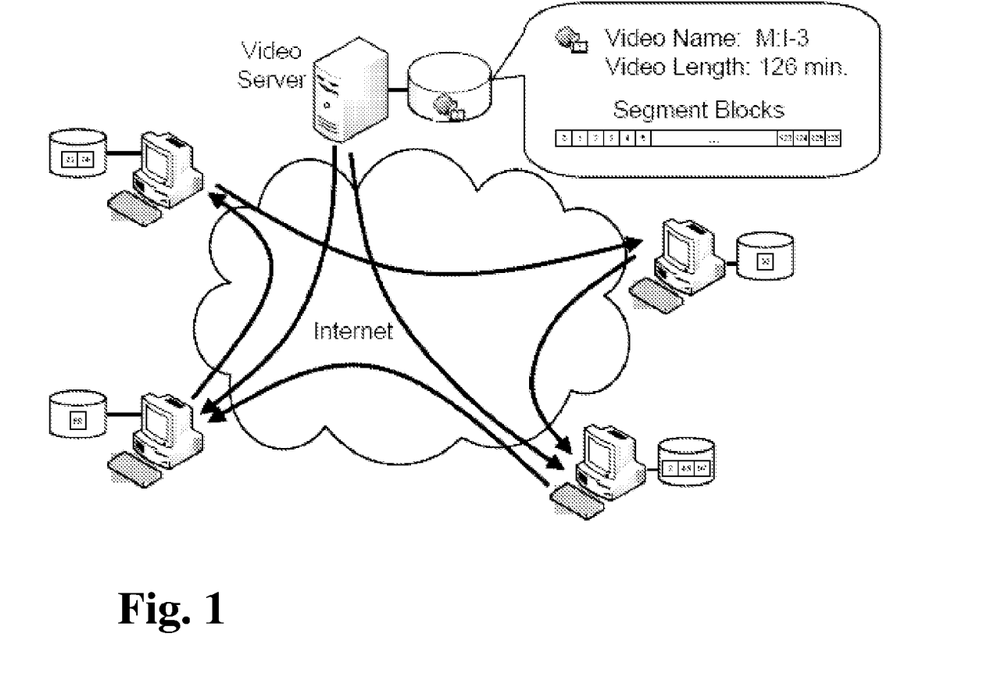
FIG. 1 shows a conceptual illustration of the VMesh concept, consistent with an example embodiment.

In an exemplary embodiment, the present innovations, called VMesh, are used to support interactive VoD service. In such embodiments, VMesh utilizes the large total storage capacity of peers to improve the supply of video segments so as to support the large interactive demand in a scalable manner. FIG. 1 depicts the concept of one example implementation. In this example of VMesh, videos are preferably divided into smaller segments (identified by segment IDs, for example) and stored in peers distributed over the network. An overlay mesh is built upon peers to support playback and interactive functionalities during playback. In this example, a peer may store one or more video segments in its local storage. It preferably keeps a list of the peers who have the previous and the next video segments. Following the list, its children can quickly find the peers who have the next requested segments. Furthermore, in some embodiments, a peer also keeps a list of peers who store the same segment for load balancing purpose. If a node is loaded, it preferably redirects some of its children to other peers on its list. In order to provide failure tolerant streaming service, a client preferably connects to multiple parents who have stored the segment of interest and hence can stream the video in parallel and collaboratively. The parents can be searched for in the P2P network using distributed hash table (DHT) with the key comprising video ID and segment ID. It is noted that, in preferred embodiments, a peer searches for a desired fragment using a DHT the first time. Pointers are used during normal playback and short jumps, in some embodiments. Pointers are also preferably implemented, for example, in load balancing. For example, there are preferably pointers to the current or same fragment, which are used to redirect requesting peers for load-balancing purposes.

A video server stores a collection of videos for user access. Videos are divided into multiple segments, say 5 minutes per segment. For example, if the video bit rate is 1 Mbps, each segment is of size only 36 MBytes, which is usually available from local storage of most peers. Since the video segments are distributed among peers. VMesh makes use of DHT built among the users to bootstrap a new video streaming session. A peer randomly stores video segment(s) in its local storage. The segment would be used to stream to another peer of interest.

An overlay mesh called video mesh (VMesh) is built among the peers. A peer keeps pointers (i.e., the IP addresses) pointing to the peers which store the next video segment, the previous video segment or the same video segment as what the peer stores (this is for redirection to achieve load-balancing).

Figure 2:
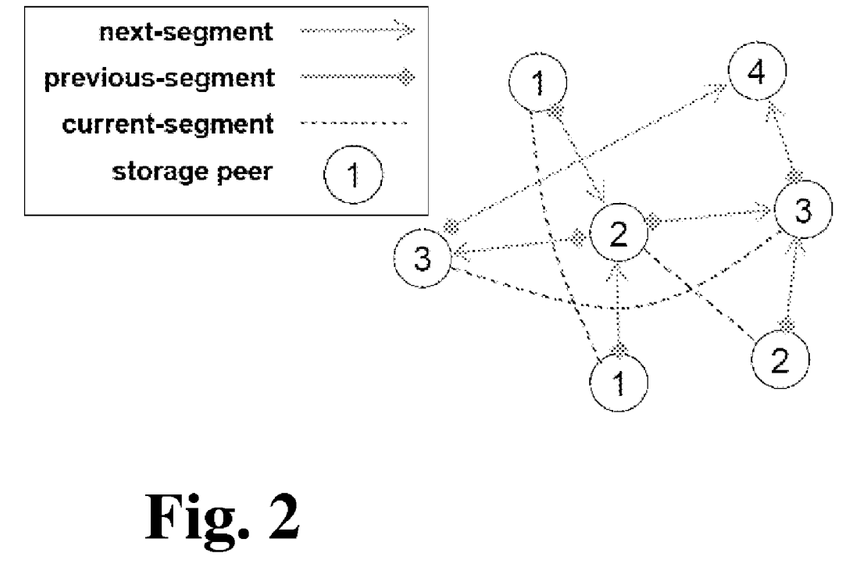
FIG. 2 shows an example embodiment where storing peers hold various video segments and at the same time keep a list of peers who possess the next, or previous, or current segments for random seeking and load balancing purposes, according to one example embodiment.

FIG. 2 illustrates the idea of VMesh. In the figure, a circle represents a storage peer and the number inside represents the ID of the segment it holds. A storage peer holds a few video segments and keeps a list of peers who have the next V previous/current segments for random seeking and load balancing purposes. The overlay links are used to redirect users to the appropriate parents who store the next requested segments. In case of joining or jumping, a VoD client in our system searches its parents using DHT and gets the stream from those parents. In the traditional "cache-and-relay" paradigm proposed in previous work, a VoD client relies on the content resides in the buffers of its parents. If the parents jump to another position in the video, the peer needs to search a new parent again. In contrast, each storage peer in VMesh would not change the video segments it stores and shares during its lifetime, and hence its activities (i.e., jumping) do not affect its children.

All peers register the search keys of their stored video segments in the DHT built among all the users. A new joining client performs the following procedure:

1) It searches for the segment of its interest using the DHT.
2) It contacts the returned list of peers and requests for the segment.
3) The contacted peers, if they have enough user capacity and bandwidth, become the client's parents for sending the requested segment. (Close parents are preferred for efficiency.) Multiple parents are used for fault tolerance purpose. There are many scheduling algorithms for packet assignment with multiple parents. We consider simple roundrobin scheduling in this work.
4) When the client nearly consumes its current segment, it requests from its current parents for their lists of peers holding the next segment. It then contacts the peers in the returned list for continuous streaming.
5) If the client wants to jump to another video position which is not far away from the current one, it can simply follow its forward/backward pointers in the video mesh to contact the new parents. On the other hand, if the new position is too far away, the client can trigger another DHT search for the segment corresponding to the new position. (Close parents can be selected from the list by measuring their round-trip times using a simple ping utility.)

Distributed Video Storage Using DHT

Network locations of the parents are quite important for efficient data dissemination. If the parent-child relationships are casually decided, there may be triangular routing between peers, wasting much network resources and increasing link stress. To address this, VMesh takes the network locations of the peers in the system into consideration.

Figure 3A:
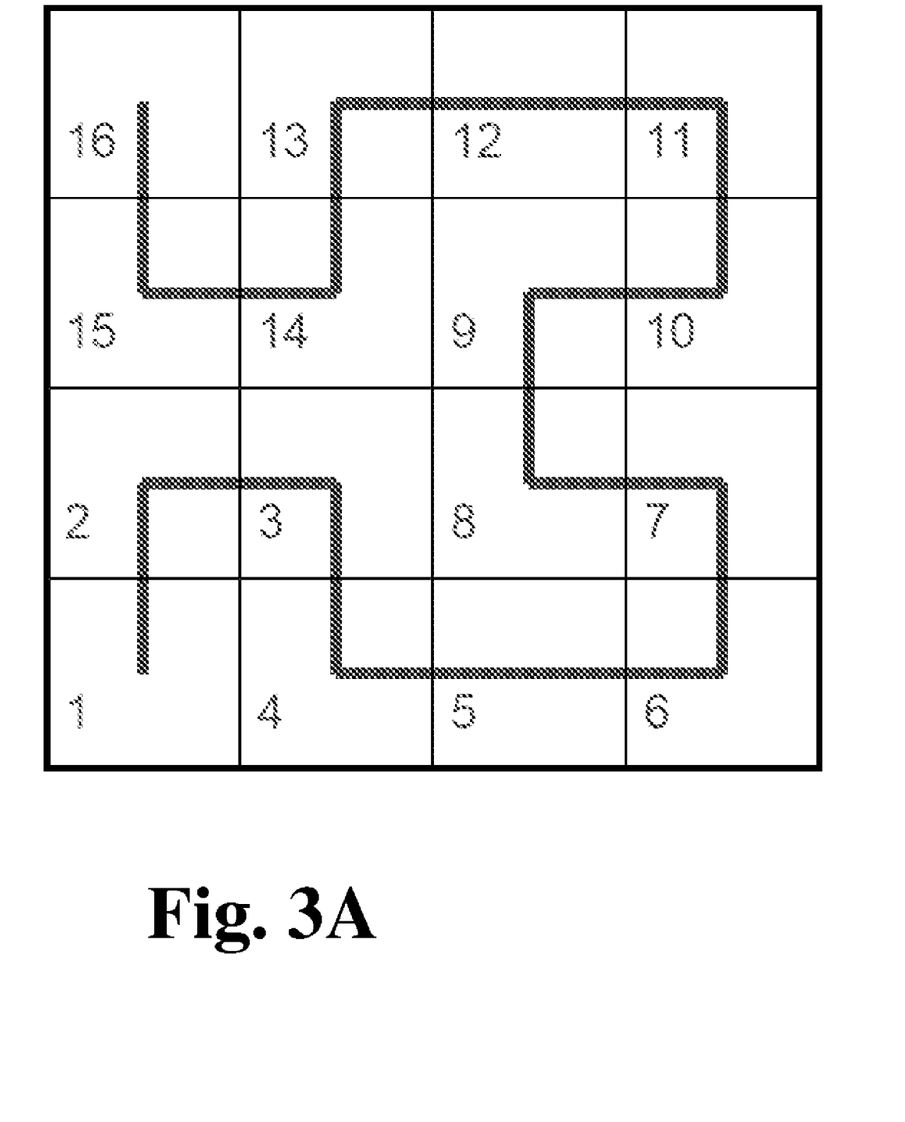
FIGS. 3A and 3B show Hilbert curve mapping used for mapping 2D network coordinates of peers to 1D numbers, where the mapped numbers are put into DHT search keys, according to an example embodiment.

The network location of a peer can be obtained using a network coordinate system like GNP and Vivaldi. Such system gathers ping measurements among peers and landmarks, and returns multi-dimensional coordinates in an Euclidean space. In order to search for parents with close network locations, we put this locality information into the DHT keys of the segments registered by the peers. Since most DHTs in structured overlays use a one-dimensional space for keys while coordinates are multi-dimensional, we need a mapping from the multi-dimensional coordinate space Rd to the one-dimensional DHT key space R. We apply space filling curve (SFC), such as Hilbert curve, for such mapping because SFC is locality preserving (i.e., if two points in the multi-dimensional space are close, their corresponding mapped one-dimensional distance is also close). FIG. 3A shows how Hilbert curve maps a two-dimensional space to a one-dimensional space.

Figure 3B:
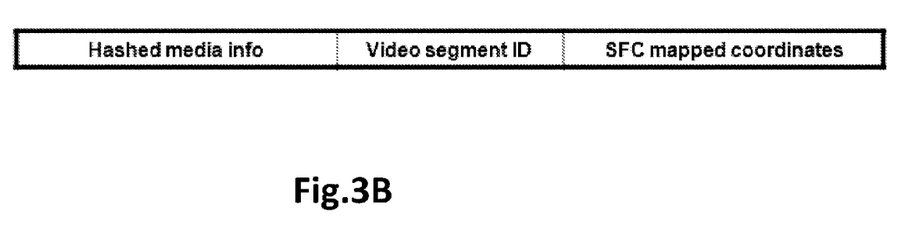

With the mapped coordinates, each peer constructs its 40-bit DHT key consisting of media information and its segment ID as well. The length of the DHT key can be extended to accommodate larger systems. The 16-bit hashed media information can already accommodate to about 65000 media objects in the system. As shown in FIG. 3B, the DHT key is constructed by combining the fields in the order of importance. The most important field is the media information, followed by the video segment ID, and then the SFC-mapped coordinates. The media information is hashed for the purpose of balancing DHT load among peers. Each peer registers its own key for its stored video segment in the DHT. At the same time, it searches for its parents using DHT search keys constructed by segment ID and its own mapped coordinates. Most DHTs can be modified to reply queries with multiple peers whose keys are numerically closest to the search key. Since the peer's own mapped coordinates are used in the search key, multiple parents closest to the requesting peer are returned. The peer can then connect to them as its parents and request for the stream.

Figure 4:
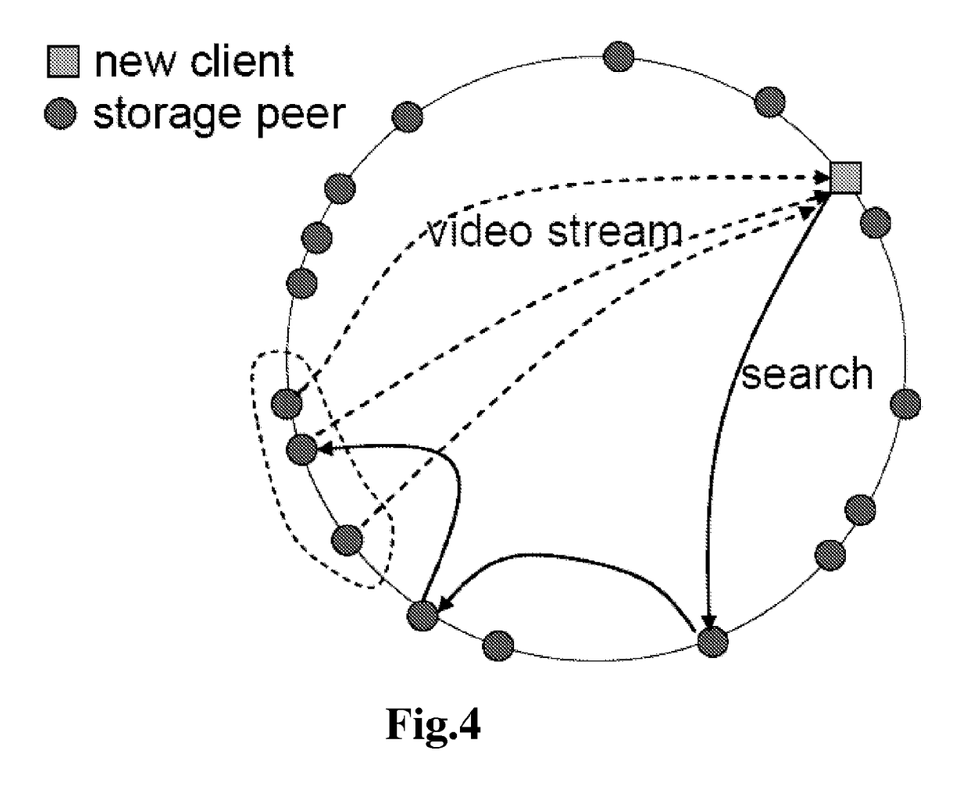
FIG. 4 shows an example embodiment wherein a client searches for the first video segment to kick off a new video streaming session.

FIG. 4 illustrates how a new client receives the requested video stream in VMesh. Firstly, it searches for the first segment of the requested video stream using DHT. Then, based on our design of DHT search key, the closest available storage peers reply and begin to serve the requesting client.

Video Mesh and its Feedback-based Maintenance

Upon entering the system, a new client may start viewing its video. Using its residual bandwidth, it also downloads some random segments for storage. After the video segment is completely downloaded, the client registers its segment(s) in the DHT. As shown in FIG. 2, a peer preferably needs to keep three lists of peer pointers (i.e., peers' IP addresses): next-segment-list, previous-segment-list and current-segment-list.

The lists could be easily obtained by searching the previous/next/current segment IDs from other peers using the DHT built among them. The pointers in the lists are used to redirect a peer's children to some other parents during playback for load-balancing purpose. In the case of normal playback, when a child nearly consumes the whole segment, it requests for some pointers in the next-segment-list from its current parents. Upon receiving the request, some pointers are sent to the child peer so as to allow it to get the next segment from other parents. In case of random seeking a favorite scene in a movie, users usually jump forward and backward in the video. Short-distance jumps, say within 10 minutes, can be satisfied by both the next-segment-list and previous-segment-list from its current parents. The current-segment-list is used when the parent's load is too heavy. Requesting peers are redirected to other peers who keep the same video segment. These lists can also reduce control messaging overhead by avoiding DHT searching for new parents by the client each time a segment is nearly used up. Instead, the storage peers search only once and keep the list.

Though searching in DHT is not an expensive operation, keeping all the pointers in the lists current requires frequent updates which may be uneconomical. We eliminate this kind of messaging overhead by employing a feedback-based mechanism for maintaining the pointers in the lists. Children of peers are responsible for checking the validity of the pointers sent by their parents. If the percentage of invalid or failed pointers is greater than a certain threshold t, the child reports the situation to its parent. Upon receiving such failure report, the parent needs to update the pointers in its list by searching for the corresponding segment using DHT again. The advantages of this passive updating mechanism are twofold: 1) The storage peers need not keep track of all pointers in their lists, which may be very costly. 2) Some failed pointers may become valid again because the failure may be transient.

Each list only contains at most k pointers. A peer does not need to keep all the qualified parents (i.e., the peers who store the segments of interest) in its lists. Due to our design of the DHT search key, the lists should contain the qualified parents whose locations are close to the client. Therefore, children of a peer are likely redirected to close parents during playback or jumping.

Simulations are performed to evaluate the performance of VMesh with various parameter settings. The performance metrics that we are interested are joining latency, jumping latency and segment missing rate.

Simulation Setup

We compare VMesh with another overlay on-demand streaming system named P2VoD. P2VoD organizes nodes into multi-level clusters according to their joining time, and the data stream is forwarded along the overlay tree built among the peers. Each host receives data from a parent in its upper cluster and forwards it to its children in its lower cluster. A new node tries to join the lowest cluster or forms a new lowest cluster. If it fails to find an available parent from the tree and the server has enough bandwidth, it directly connects to the server. In our experiment, we use Smallest Delay Selection for P2VoD's parent selection process. And, we set the system parameter K=6 and the cache size MB to be 5 minutes of video in the system (K is the maximum number of clients allowed in the first generation of each video session).

We build VMesh on top of a public Chord implementation. In our simulations, the length and bit rate of a movie are 120 minutes and 1 Mbps, respectively. Each segment is 5 minutes long and of size about 36 MBytes. Each peer stores one video segment at its local storage. The peers participating in the system follow a Poisson arrival, each being randomly attached to a router node and requesting the video from the beginning. Group size, i.e. the total number of peers in a measurement session, varies from 200 to 12800. The underlying network topology is created using GT-ITM. The whole network consists of 4080 routers and about 20000 links. In case a new client is unable to find available parent(s), the client is rejected to be served.

Results

We studied the joining latency in terms of hop count in P2VoD and VMesh. Note that we have observed negligible rejection rate in both systems with our settings. We hence do not discuss rejection rates in the following. The join latency in P2VoD increases almost linearly with the group size, while that in VMesh only increases in logarithmic scale. In P2VoD, a new node first sequentially searches the second lowest cluster to find a parent with enough bandwidth. If that fails, it forms a new cluster and sequentially searches the lowest cluster to find a parent with enough bandwidth. If that fails again, it tries to connect to the server directly. With more nodes in the system, a new node usually needs to search more nodes for an appropriate parent. On the other hand, in VMesh, a new node can quickly locate nodes with the first several segments through DHT routing. The searching time via DHT is shown to be $O(\log N)$ where N is the number of nodes in the system. The latency is hence significantly reduced.

We also compared the jumping (forward or backward) latency in the two systems. As shown in the figure, the jumping latency in P2VoD increases much more quickly than that in VMesh. P2VoD has not been specially optimized for quick jumping. If a user initiates a jumping request, the node needs to sequentially search its upper or lower clusters. In the case of a large group of users, the number of clusters is very large and the search cost is high. In VMesh, however, a jumping request and a joining request are almost the same. In either case, the node searches for a certain segment through the DHT network. For a short-distance jump request, a client could request from its current parents for peers who have the previous/next segment. The searching time can be further improved.

Figure 5:
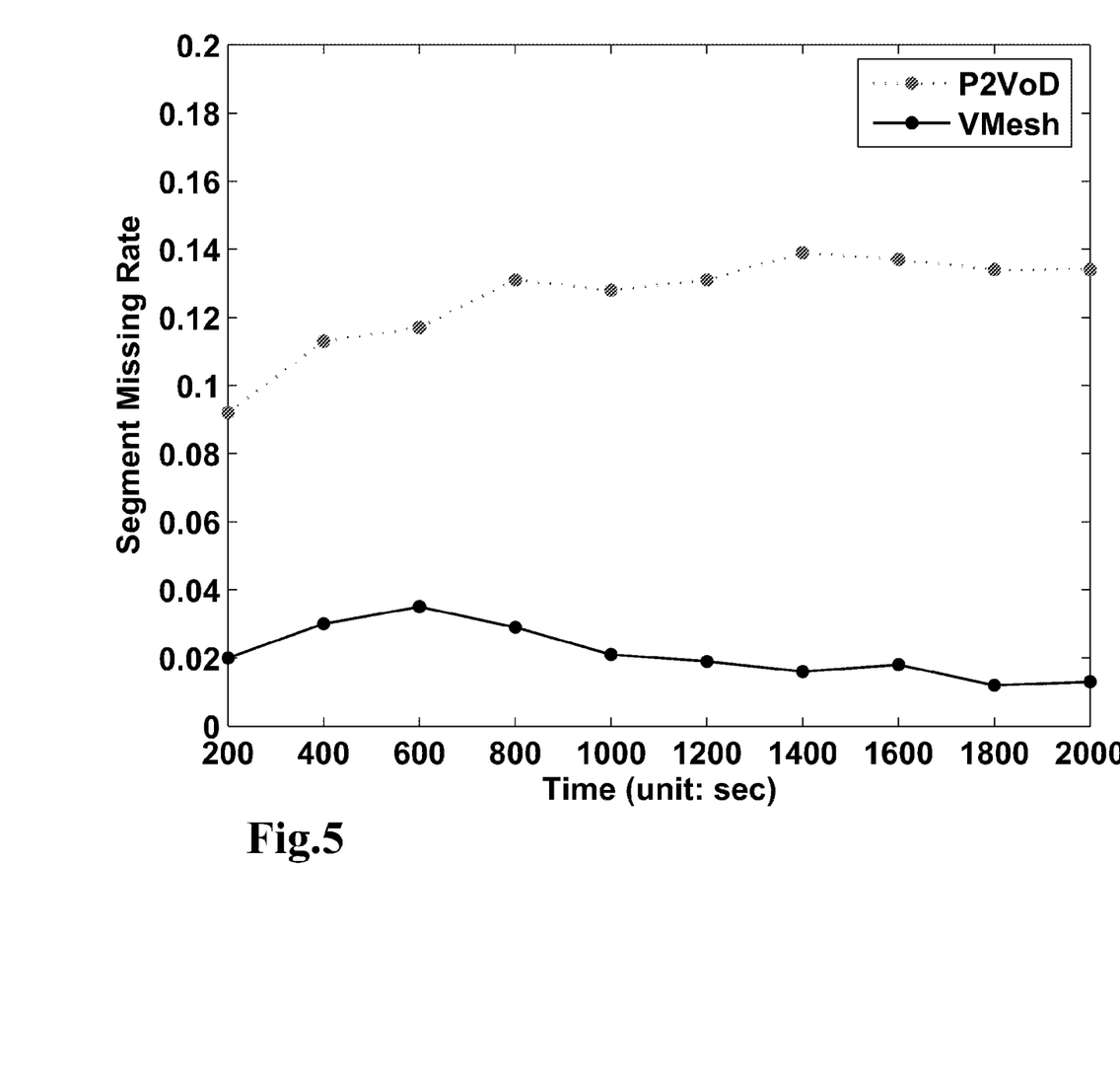
FIG. 5 shows a chart with average segment missing rate.

FIG. 5 shows the segment missing rate (SMR) in a dynamic network. A data segment is considered missing if it is not available at a node till the playback time, and the SMR for the whole system is the average ratio of the missed segments at all the participating nodes in the session. As the figure shows, VMesh achieves much smaller SMR (below 5%) than P2VoD (around 14%). With error resilient coding techniques such as interleaving, such a loss rate can be efficiently masked. Since P2VoD uses a single overlay tree for data delivery, the error rates for the nodes are increasing down the tree. Each P2VoD node maintains a large number of peer information, including its parent, children and siblings in the same cluster. If a node loses some segments because of background traffic, it needs to request for retransmission from its parent. In VMesh, however, we adopt a different approach to address this problem. Using multiple parents, while one of the parents fails to deliver its assigned packets, the remaining ones could be immediately requested to recover the missing packets. In addition, with DHT searching, multiple parents that store the desired segment can be found in one search. In case of data loss from some parents, the others can be quickly contacted for recovery. Furthermore, each storing peer maintains a few pointers to peers storing the same segment. This can also help its children quickly locate new qualified parents in case of node failure.

According to a disclosed class of innovative embodiments, there is provided: A peer-to-peer network architecture for media transmission, comprising: a plurality of peers, individually storing at least one respective fragment of some media program, and containing pointers to preceding and following fragments; and at least one user station, which searches said peers to find a peer which contains a fragment of a desired media program, and thereafter uses said pointers to transition between fragments of said media program.

According to a disclosed class of innovative embodiments, there is provided: A peer-to-peer network architecture for media transmission, comprising: a plurality of peers, individually storing at least one respective fragment of some media program, and containing pointers to preceding and following fragments; and at least one user station, which, after finding a parent peer which contains a fragment of a desired media program, thereafter uses said pointers from said parent peer to transition between fragments of said media program, and which initiates correction in at least partial dependence on the fraction of incorrect pointers received from said parent peer.

According to a disclosed class of innovative embodiments, there is provided A peer-to-peer network architecture for media transmission, comprising: a plurality of peers, individually storing at least one respective fragment of some media program; at least some ones of said peers containing pointers to preceding and/or following fragments of said media program; at least some ones of said peers also containing pointers to one or more alternative locations of the same said fragment; and at least one user station, which searches said peers using a distributed hash table to find a peer which contains a fragment of a desired media program, and which uses said pointers to find a desired fragment of said media program by moving, in accordance with said pointers, to preceding or following ones of said fragments; and which uses alternative-location pointers to access alternative locations in accordance with load balancing requirements.

According to a disclosed class of innovative embodiments, there is provided: A method for on-demand multimedia streaming in peer-to-peer networked devices, comprising the actions of: in a plurality of peers, locally storing both a respective fragment of some media program, and also pointers to preceding and following fragments; and when new content is desired in a user station, then searching to find a peer which contains a fragment of the desired content, and thereafter using said pointers to transition between fragments of said media program.

According to a disclosed class of innovative embodiments, there is provided: A method for on-demand multimedia streaming in peer-to-peer networked devices, comprising the actions of: in a plurality of peers, locally storing both a respective fragment of some media program, and also pointers to preceding and following fragments; and in a user station, finding at least one parent peer which contains a fragment of a desired media program, and thereafter using said pointers from said parent peer to transition between fragments of said media program; and initiating correction in at least partial dependence on the fraction of incorrect pointers received from said parent peer.

According to a disclosed class of innovative embodiments, there is provided: A computing device which is programmed to, when a user requests a media program, execute relevant steps of one of he above methods as one of the nodes therein.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, in preferred embodiments a program is typically streamed out from source, but could alternatively be downloaded in blocks.

For another example, the user station which can access fragments in peers can optionally be allowed to not be a peer. For example, a user who has rights to download a video to a P2P peer may also be given rights to download such a video in distributed storage.

For another example, the disclosed innovations can optionally be used in an architecture where a video feed is subdivided into multiple parallel feeds, divided e.g. by color or by codes or by other two-dimensional or three-dimensional orthogonal bases. Such systems tend to provide graceful degradation under bandwidth constraints.

Additional general background, which helps to show variations and implementations (and in some cases prior art), may be found in the following publications, all of which are hereby incorporated by reference:

[1] K. A. Hua, Y. Cai, and S. Sheu, "Patching: A Multicast Technique for True Video-on-Demand Services," in Proceedings of the 6th ACM InternationalConference on Multimedia (MM), Bristol, England, September 1998.

[2] L. Gao, D. Towsley, and J. Kurose, "Efficient Schemes for Broadcasting Popular Videos," in Proceedings of the 8th ACM International Workshop on Network and Operating Systems Support for Digital Audio and Video (NOSSDAV), Cambridge, UK, July 1998.

[3] Y. Chu, S. Rao, and H. Zhang, "A Case for End System Multicast," in Proceedings of ACM SIGMETRICS, Santa Clara, Calif., USA, June 2000.

[4] [Online]. Available: http://www.bittorrent.com

[5] X. Zhang, J. Liu, B. Li, and T.-S. P. Yum, "CoolStreaming/DONet: A Data-driven Overlay Network for Live Media Streaming," in Proceedings of IEEE INFOCOM, Miami, Fla., USA, March 2005.

[6] K. Sripanidkulchai, A. Ganjam, B. Maggs, and H. Zhang, "The Feasibility of Supporting Large-Scale Live Streaming Applications with Dynamic Application End-Points," in Proceedings of ACM SIGCOMM, Portland, Oreg., USA, August 2004.

[7] A. Sharma, a. Bestavros, and I. Matta, "dPAM: A Distributed Prefetching Protocol for Scalable Asynchronous Multicast in P2P Systems," in Proceedings of IEEE INFOCOM, Miami, Fla., USA, March 2005.

[8] M. Zhou and J. Liu, "A Hybrid Overlay Network for Video-on-Demand," in Proceedings of IEEE International Conference on Communications (ICC), Seoul, Korea, May 2005.

[9] Y. Cui, B. Li, and K. Nahrstedt, "oStream: Asynchronous Streaming Multicast in Application-Layer Overlay Networks," IEEE Journal on Selected Areas in Communications (JSAC), vol. 22, no. 1, January 2004.

[10] M. Guo, M. H. Ammar, and E. W. Zegura, "Coooperative Patching: A Client based P2P Architecture for Supporting Continuous Live Video Streaming," in Proceedings of the 13th IEEE International Conference on Computer Communications and Networks (ICCCN), Chicago, Ill., USA, October 2004.

[11] T. T. Do, K. A. Hua, and M. A. Tantaoui, "P2VoD: Providing Fault Tolerant Video-on-Demand Streaming in Peer-to-Peer Environment," in Proceedings of IEEE International Conference on Communications (ICC), Paris, France, June 2004.

[12] M. Hefeeda, A. Habib, B. Botev, D. Xu, and B. Bhargava, "PROMISE: Peer-to-Peer Media Streaming Using CollectCast," in Proceedings of the 11th ACM International Conference on Multimedia (MM), Berkeley, Calif., USA, November 2003, pp. 45-54.

[13] V. N. Padmanabhan, H. J. Wang, P. A. Chou, and K. Sripanidkulchai, "Distributing Streaming Media Content Using Cooperative Networking," in Proceedings of the 12th ACM International Workshop on Network and Operating Systems Support for Digital Audio and Video (NOSSDAV), Miami Beach, Fla., USA, May 2002.

[14] I. Stoica, R. Morris, D. Liben-Nowell, D. R. Karger, M. F. Kaashoek, F. Dabek, and H. Galakrishnan, "Chord: A scalable peer-to-peer lookup protocol for internet applications," IEEE/ACM Transactions on Networking, vol. 11, no. 1, pp. 17-32, 2003.

[15] A. Rowstron and P. Druschel, "Pastry: Scalable, Distributed Object Location and Routing for Large-Scale Peer-to-Peer Systems," in Proceedings of IFIP/ACM International Conference on Distributed Systems Platforms (Middleware), Heidelberg, Germany, November 2001, pp. 329-350.

[16] S. Ratnasamy, P. Francis, M. Handley, R. Karp, and S. Shenker, "A Scalable Content-Addressable Network," in Proceedings of ACM SIGCOMM, San Diego, Calif., USA, August 2001.

[17] A. Hu, "Video-on-Demand Broadcasting Protocols: A Comprehensive Study," in Proceedings of IEEE INFOCOM, Anchorage, Ak., USA, April 2001.

[18] Y. Guo, L. Gao, D. Towsley, and S. Sen, "Seamless Workload Adaptive Broadcast," in Proceedings of IEEE International Packetvideo Workshop, Pittsburgh, Pa., USA, April 2002.

[19] D. Eager, M. Vernon, and J. Zahorjan, "Bandwidth Skimming: A Technique for Cost-effective Video-on-Demand," in Proceedings of SPIE/ACM Conference on Multimedia Computing and Networking (MMCN), San Jose, Calif., USA, January 2000.

[20] M. Gao and M. H. Ammar, "Scalable live video streaming to cooperative clients using time shifting and video patching," in Proceedings of IEEE INFOCOM, Hong Kong, April 2004.

[21] M. Castro, P. Druschel, A.-M. Kermarree, A. Nandi, A. Rowstron, and A. Singh, "SplitStream: High-Bandwidth Multicast in Cooperative Environments," in Proceedings of

[22] D. Kostic, A. Rodriguez, J. Albrecht, and A. Vahdat, "Bullet: High Bandwidth Data Dissemination Using an Overlay Mesh," in Proceedings of the 19th ACM Symposium on Operating Systems Principles, The Sagamore, Bolton Landing (Lake George), New York, October 2003.

[23] Y. Guo, K. Suh, J. Kurose, and D. Towsley, "P2Cast: Peer-to-peer Patching Scheme for VoD Service," in Proceedings of the 12th ACM International World Wide Web Conference (WWW), Budapest, Hungary, May 2003.

[23] K. A. Hua, D. A. Tran, and R. Villafane, "Overlay Multicast for Video On Demand on the Internet," in Proceedings of the 18th ACM Symposium on Applied Computing (SAC), San Francisco, Calif., USA, March 2003.

[25] D. A. Tran, K. A. Hua, and T. T. Do, "Layered Range Multicast for Video On Demand," in Proceedings of the 11th IEEE Conference on Computer Communications and Networks (ICCCN), Miami, Fla., USA, October 2002.

[26] M. Zhou and J. Liu, "Tree-Assisted Gossiping for Overlay Video Distribution," Kluwer Multimedia Tools and Applications, 2005, to appear.

[27] T. S. E. Ng and H. Zhang, "Predicting Internet Network Distance with Coordinates-Based Approaches," in Proceedings of IEEE INFOCOM, New York, N.Y., USA, June 2002.

[28] F. Dabek, R. Cox, F. Kaashoek, and R. Morris, "Vivaldi: A Decentralized Network Coordinate System," in Proceedings of ACM SIGCOMM, Portland, Oreg., USA, August 2004.

[29] T. Asano, D. Ranjan, T. Roos, E. Welzl, and P. Widmaier, "Space Filling Curves and Their Use in Geometric Data Structures," Theoretical ComputerScience, vol. 181, no. 1, pp. 3–15, July 1997.

[30] "The Chord/DHash project." [Online]. Available: http://pdos.csail.mit.edu/chord/#downloads

[31] E. W. Zegura, K. Calvert, and S. Bhattacharjee, "How to Model an Internetwork," in Proceedings of IEEE INFOCOM, San Francisco, Calif., USA, April 1996.

[32] Y. Wang, S. Wenger, J. Wen, and A. G. Katsaggelos, "Error resilient video coding techniques," IEEE Signal Processing Magazine special issue on Multimedia Communications over Networks, vol. 17, no. 4, pp. 61-82, July 2000.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A peer-to-peer network architecture for media transmission, comprising:
a plurality of peers configured in a scalable non-hierarchical topology, each of the plurality of peers individually storing at least one respective fragment of at least one media program, and storing at least one pointer to a fragment that at least one of precedes or follows the at least one respective fragment of the at least one media program; and
at least one user station adapted to search said plurality of peers to find a peer storing a desired fragment of the at least one media program, and thereafter uses said at least one pointer to transition between fragments of the at least one media program from among the plurality of peers, whereby the at least one media program is played in sequence by the user station and wherein the at least one user station is configured to initiate correction of the at least one pointer based at least in part on a fraction of incorrect pointers received from the plurality of peers.

2. The peer-to-peer network architecture of claim 1, the at least one user station is further configured to search using a distributed hash table.

3. The peer-to-peer network architecture of claim 1, the at least one user station is further configured to search using a table comprising implicit localization information.

4. The peer-to-peer network architecture of claim 1, the plurality of peers includes the at least one user station.

5. The peer-to-peer network architecture of claim 1, at least one of the at least one respective fragment, the fragment that at least one of precedes or follows the at least one respective fragment, or the desired fragment comprise a multi-frame time segment of a video program.

6. The peer-to-peer network architecture of claim 1, the at least one user station searches initially, when joining the plurality of peers in the peer-to-peer network architecture, by accessing a defined rendezvous server.

7. A peer-to-peer network architecture for media transmission, comprising:
a plurality of peers configured in a scalable non-hierarchical topology, at least one peer of the plurality of peers individually storing at least one fragment of a media program, and storing at least one pointer to a fragment that at least one of precedes or follows the at least one fragment of the media program; and
at least one user station adapted to, after finding a parent peer of the plurality of peers that stores a desired fragment of the media program, thereafter uses the at least one other pointer from said parent peer to transition between fragments of said media program, and which initiates correction based at least in part on a fraction of incorrect pointers received from said parent peer.

8. The peer-to-peer network architecture of claim 7, the at least one user station further configured to send a communication to initiate correction.

9. The peer-to-peer network architecture of claim 7, the at least one user station further configured to use a distributed hash table to find said parent peer.

10. The peer-to-peer network architecture of claim 7, the at least one user station further configured to use a table containing implicit localization information to find said parent peer.

11. The peer-to-peer network architecture of claim 7, the plurality peers includes the at least one user station.

12. The peer-to-peer network architecture of claim 7, at least one of the at least one fragment of the media program, the fragment that at least one of precedes or follows the at least one fragment of the media program, or the desired fragment comprises multi-frame time segments of a video program.

13. The peer-to-peer network architecture of claim 7, the at least one user station searches initially, when joining the plurality of peers in the peer-to-peer network architecture, by accessing a rendezvous server.

14. A peer-to-peer network architecture for media transmission, comprising:

a plurality of peers configured in a scalable non-hierarchical topology, each of the plurality of peers and individually storing at least one respective fragment of a media program;

at least a first of said plurality of peers storing a pointer to at least one fragment of said media program, the at least one fragment at least one of precedes or follows the at least one respective fragment;

at least a second of said plurality of peers storing a pointer to at least one alternative location of the at least one fragment; and at least one user station adapted to search said plurality of peers using a distributed hash table to find a peer of the plurality of peers, the peer having a fragment of a desired media program, and which at least one user station uses the pointers of the first and second peers to find a desired fragment of the desired media program corresponding to the at least one respective fragment by moving, in accordance with the pointers, to the at least one fragment that at least one of precedes or follows the at least one respective fragment and the at least one user station is configured to initiate correction of the pointers of the first and second peers based at least in part on a fraction of incorrect pointers received from the first and second peers; and the at least one user station uses the pointer to the at least one alternative location to access alternative locations in accordance with a load balancing requirement.

15. The peer-to-peer network architecture of claim 14, the at least one user station further configured to search using a table including implicit localization information.

16. The peer-to-peer network architecture of claim 14, the plurality of peers includes the at least one user station.

17. The peer-to-peer network architecture of claim 14, at least one of the at least one respective fragment, the at least one fragment of said media program, the fragment of a desired media program, or the desired fragment of the desired media program comprises multi-frame time segments of a video program.

18. The peer-to-peer network architecture of claim 14, the at least one user station searches initially, when joining the plurality of peers in the peer-to-peer network architecture, by accessing a defined rendezvous server.

* * * * *